(12) United States Patent
English et al.

(10) Patent No.: US 11,571,873 B2
(45) Date of Patent: Feb. 7, 2023

(54) FABRIC WITH FOAM CORE

(71) Applicant: SWNR Development, LLC, Pagosa Springs, CO (US)

(72) Inventors: Dustin English, Pagosa Springs, CO (US); Timm Smith, Pagosa Springs, CO (US); Daniel L. English, Pagosa Springs, CO (US)

(73) Assignee: SWNR Development, LLC, Pagosa Springs, CO (US)

( * ) Notice: Subject to any disclaimer, the term of this patent is extended or adjusted under 35 U.S.C. 154(b) by 4 days.

(21) Appl. No.: 17/121,402

(22) Filed: Dec. 14, 2020

(65) Prior Publication Data

US 2021/0178724 A1   Jun. 17, 2021

Related U.S. Application Data

(60) Provisional application No. 62/947,882, filed on Dec. 13, 2019.

(51) Int. Cl.
*B32B 5/24* (2006.01)
*B32B 5/06* (2006.01)
*D06M 17/10* (2006.01)

(52) U.S. Cl.
CPC ............ *B32B 5/245* (2013.01); *B32B 5/06* (2013.01); *B32B 2266/057* (2016.11); *B32B 2266/126* (2016.11); *D06M 17/10* (2013.01)

(58) Field of Classification Search
CPC .......... B32B 2266/126; B32B 2266/08; B32B 27/065; A41D 31/065; A41D 31/06
See application file for complete search history.

(56) References Cited

U.S. PATENT DOCUMENTS

| | | | | |
|---|---|---|---|---|
| 2005/0281988 | A1* | 12/2005 | McCormick | B32B 5/22 428/190 |
| 2010/0263154 | A1* | 10/2010 | Wildeman | A47L 13/16 15/244.4 |
| 2012/0141719 | A1* | 6/2012 | Payne | E04B 1/78 428/68 |
| 2014/0075646 | A1* | 3/2014 | Henssen | D03D 1/0041 87/8 |
| 2014/0134391 | A1* | 5/2014 | Lumb | B32B 5/06 428/102 |

OTHER PUBLICATIONS

Aegerter, Michel A., et al.; "Aerogels Handbook—Advances in Sol-Gel Derived Materials and Technologies" Springer; 2011; 972 pages.

* cited by examiner

*Primary Examiner* — Alicia J Sawdon
(74) *Attorney, Agent, or Firm* — Conley Rose, P.C.; William H. Dietrich

(57) ABSTRACT

A stitched fabric including a foam core and a yarn stitched through and forming stitch holes in the foam core, where the yarn extends over at least a majority of a width and a length of the stitched fabric. In some cases, the yarn and the foam core are free from contact by another layer on either side of the foam core. In some cases, a barrier layer is disposed over at least one side of the foam core and a melted portion of the barrier layer fills a portion of the stitch holes. In some cases, the foam core is a closed cell aerogel foam core.

17 Claims, 4 Drawing Sheets

FABRIC WITH FOAM CORE

CROSS-REFERENCE TO RELATED APPLICATIONS

This application claims the benefit of U.S. Provisional Patent Application No. 62/947,882 filed Dec. 13, 2019, by Dustin English, et al., and titled, "Fabric with Foam Core," which is hereby incorporated by reference.

BACKGROUND

Garment makers and others in similar industries have a continuing goal of creating or making available to consumers the most comfortable product for the intended end use.

Several factors, either alone or in combination, may affect the overall comfort of a particular product. These factors may include, but are not limited to, whether or to what extent the product is air permeable, breathable, water resistant or waterproof, or stretchable. In addition, the comfort of a particular product may hinge on whether the product provides effective insulation.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Disclosed herein is a fabric incorporating or benefiting from a foam core. By constructing a soft, stretchable, wicking knit with a foam core (e.g., closed cell aerogel foam core), an improved garment (e.g., a coat, jacket, hat, gloves, footwear, etc.) with enhanced insulating properties may be produced. Therefore, those having, for example, an active or outdoor lifestyle are able to keep warm (e.g., skiers, hikers, bikers, motorcyclists, etc.) by wearing garments incorporating the fabric.

Figure 1:
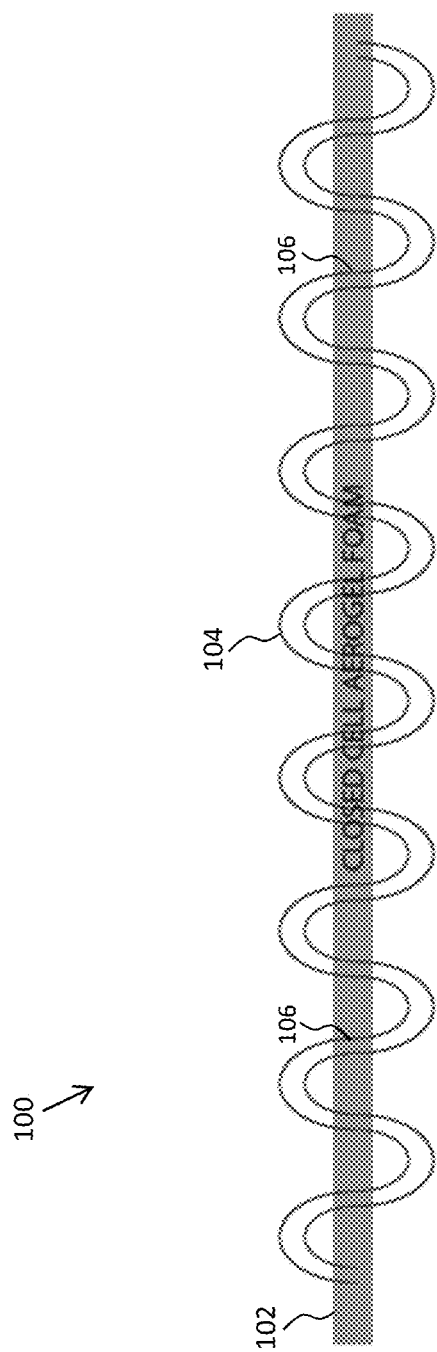
FIG. 1 is a cross section of an embodiment of a stitched fabric having a foam core stitched through by a yarn.

Referring to FIG. 1, an embodiment fabric 100 is illustrated. The fabric 100 may have a variety of beneficial properties. For example, the fabric 100 is soft, stretchable, able to wick away moisture, and protects a wearer of a garment formed from the fabric 100 from cold weather or reduced temperatures. As shown in FIG. 1, in an embodiment the fabric 100 includes a foam core 102 and a yarn 104.

In an embodiment, the foam core 102 comprises a closed cell foam such as aerogel. Aerogel is a synthetic porous ultralight material derived from a gel, in which the liquid component of the gel has been replaced with a gas. The result is a solid with extremely low density and low thermal conductivity. In other words, aerogel is a good light-weight insulator. Aerogels can be made from a variety of chemical compounds as discussed in the Aerogels Handbook authored by Aegerter, M. A.; N. Leventis; M. M. Koebel (2011) and published by Springer publishing, which is incorporated herein by reference as if reproduced in its entirety.

In an embodiment, the foam core 102 comprises a silica or silica-based aerogel. Silica aerogel has remarkable thermal insulative properties, and has an extremely low thermal conductivity from 0.03 Watts per meter-Kelvin (W/(m·K) in atmospheric pressure down to 0.004 W/(m·K) in modest vacuum. This corresponds to R-values of 14 to 105 (US customary) or 3.0 to 22.2 (metric) for a 3.5 inch (89 mm) thickness. For comparison, typical wall insulation in the United States is about 13 (US customary) or 2.7 (metric) for the same thickness. The melting point of silica aerogel is about 1,473 Kelvin (1,200° C.; 2,192° F.).

In an embodiment, the foam core 102 comprises neoprene or other wetsuit material. Neoprene (also polychloroprene) is a family of synthetic rubbers that are produced by polymerization of chloroprene. Neoprene exhibits good chemical stability and maintains flexibility over a wide temperature range. In an embodiment, the foam core 102 comprises an orthopedic bracing material (e.g., a soft, stretchable material suitable for providing orthopedic support).

Although a single layer of the foam core 102 is illustrated, two or more layers may be utilized in the fabric 100. That is, several layers may be used to establish or foam the foam core 102. In an embodiment, the foam core 102 incorporates one or more non-foam layers (e.g., a barrier layer, a substrate layer used for structural support, an insulating layer, etc.) sandwiched between layers of foam.

Still referring to FIG. 1, the yarn 104 is stitched through the foam core 102. In an embodiment the yarn 104 is a polyester or polyester-blend yarn, a nylon or nylon containing yarn, or other type of yarn. The yarn 104 may be chemically or otherwise treated to resist stains, repel moisture, resist flames, or provide other beneficial properties.

As shown, the yarn 104 is stitched through more than a majority (e.g., greater than 50%) of the foam core 102. In other words, the yarn 104 is stitched over a substantial portion of the length and width of foam core 102. Depending on how tightly the stitching is performed, the yarn 104 may permit portions of the underlying foam core 102 to be visible or may obscure all or a portion of the underlying foam core 102. In an embodiment, the yarn 104 and the foam core 102 are free from contact by another layer on either side of the foam core 102. That is, no other layer is formed over or upon the yarn 104 and the foam core 104 in some circumstances such that the yarn 104 and the foam core 102 alone make up the fabric 100.

In an embodiment, the fabric 100 of FIG. 1 is constructed by stitching a polyester yarn 104 through the foam core 102 such that the majority of the surface area of the foam core 102 is covered. During the stitching process, the yarn 104 forms stitch holes 106 through the foam core 102 as shown in FIG. 1. In some circumstances, it is desirable to seal off or plug these stitch holes 106. To do so, a barrier layer 208 may be disposed over at least one side of the foam core 202 as shown in the fabric 200 of FIG. 2. As will be more fully explained below, some or all of the stitch holes 206 formed by the yarn 204 are partially or fully filled when the barrier layer 208 is sufficiently heated. For example, the barrier layer 208 may be heated to a thermoplastic state, which allows a portion of the barrier layer 208 to flow and plug a portion of the stitch holes 206 in the barrier layer 208.

The barrier layer 208 is configured to inhibit fluid flow and prevents water or other liquids from reaching the foam layer core 202. In other words, the barrier layer 208 is generally water resistant or waterproof. Therefore, the barrier layer 208 functions to discourage fluid flow through the fabric 200. In addition, in an embodiment the barrier layer 208 is also windproof, yet still permits the fabric 200 to be breathable. In other words, the barrier layer 208 is able to block wind from undesirably passing through the fabric 200 while still permitting moisture vapor generated by, for example, body heat to be dissipated. In an embodiment, the barrier layer 208 is stretchable or suitably elastomeric in order to compliment the degree of stretch afforded by the foam core 202.

Figure 3:
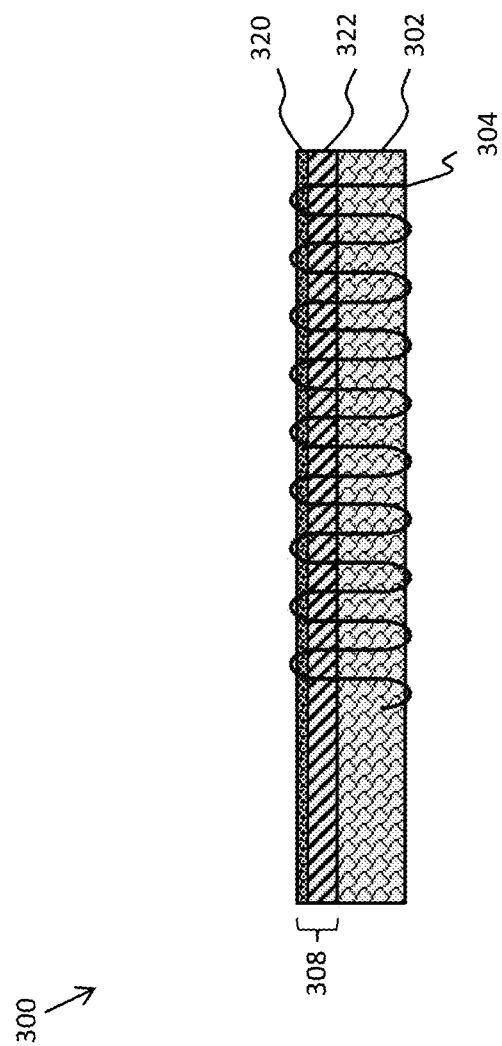
FIG. 3 is a cross section of an embodiment of a stitched fabric having a foam core stitched through by a yarn and covered by a multi-component barrier layer.

In FIG. 3, a fabric 300 including a foam core 302, yarn 304, and a composite barrier layer 308 is shown. In an embodiment, the barrier layer 308 comprises an adhesive 320 and an intermediate material 322 (e.g., a porous membrane or a non-porous film) as shown in FIG. 3. In an embodiment, the barrier layer 308 may include several adhesive 320 layers and/or several intermediate layers 322.

A melting point of the adhesive 320 is generally lower than a melting point of the intermediate material 322. Therefore, the adhesive 320 may be melted without also melting the intermediate material 322. In other words, the adhesive 320 may be forced to flow through the application of sufficient heat without flowing, or compromising the integrity of, the intermediate material 322.

In an embodiment, the melting point of the adhesive 320 may be between about 140° C. to about 180° C. (about 284° F. to about 356° F.) while the melting point of the intermediate material 322 exceeds about 180° C. (about 356° F.). Where the adhesive 320 and the intermediate material 322 have different distinct melting points as noted above, the barrier layer 308 may be referred to as having an "A-B" type format. In an embodiment, the adhesive 320 is approximately two thousandths of an inch (i.e., 2 mils) and the intermediate material 322 is approximately one thousandth of an inch (i.e., 1 mil).

In general, the adhesive 320 is a thermoplastic, copolyamide, or other suitably meltable type of material capable of bonding two layers of fabric together. A variety of different adhesives 320 may be used in the barrier layer 308. By way of example, the adhesive 320 may be a high-quality textile adhesive such a polyurethane adhesive film, an ethylene-vinyl acetate, and the like. In an embodiment, the adhesive 320 may be heat sensitive, pressure sensitive, or both.

The intermediate material 322 of the barrier layer 308 may be either a membrane or a film formed from a variety of different materials. In an embodiment, the intermediate material 322 is formed from polyurethane, polyester, urethane, polyether, polytetrafluoroethylene (PTFE), or another polymer-based material. The intermediate material 322 may be manufactured using, for example, an extrusion, a melt blowing, or an electrospinning process.

Figure 2:
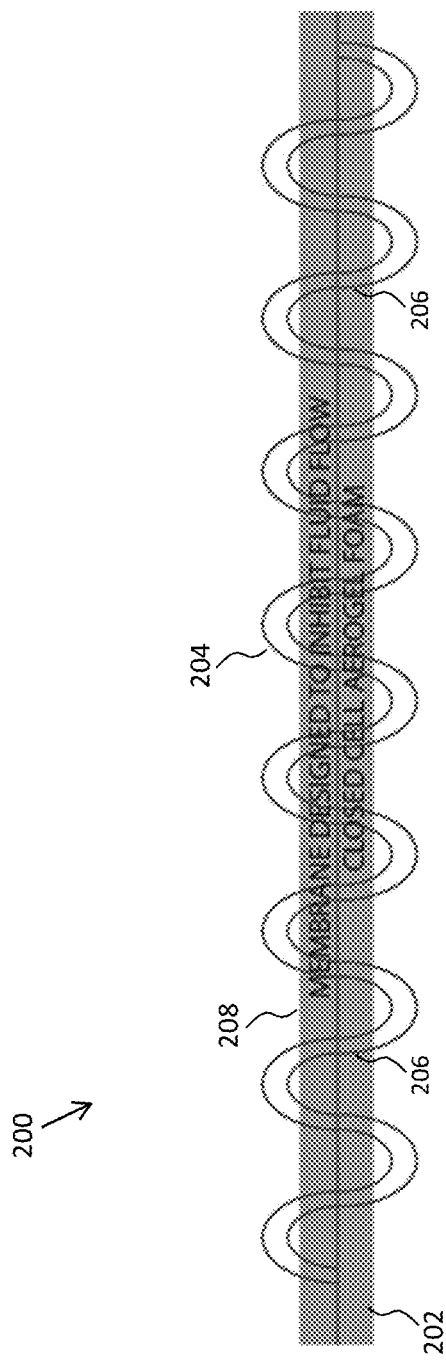
FIG. 2 is a cross section of an embodiment of a stitched fabric having a foam core stitched through by a yarn and covered by a barrier layer.

As shown in FIGS. 1-3, the fabric 100, 200, 300 is free of any other layer (e.g., a face layer or an interior layer). As such, the foam core 102-302 and the yarn 104-304 are free from contact by another layer on either side of the foam core 102-302. In an embodiment, the foam core 302, the barrier layer 308, and the yarn 304 are free from contact by another layer as shown in FIG. 3. Even so, in an embodiment other layers (e.g., a face layer, an interior layer, etc.) may be added to the fabrics.

In an embodiment, the fabrics 100-300 disclosed herein may be used for thin/flexible footwear applications, as flexible tapes that can wrap around water lines (e.g., from hydration packs to copper pipes in houses), for apparel, for thin/flexible/warm gloves, and so on.

Figure 4:
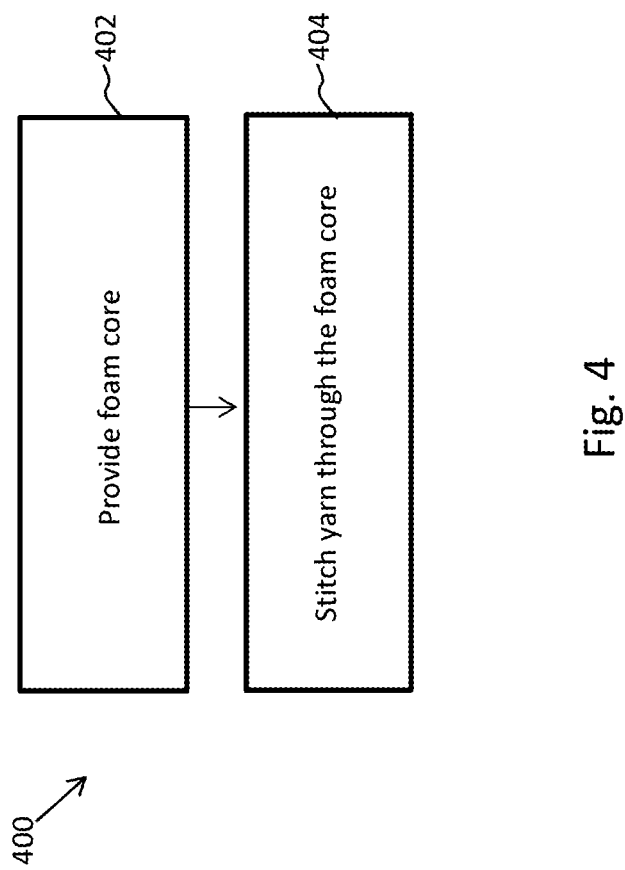
FIG. 4 is an embodiment of a method of forming the stitched fabric of FIG. 1.

In FIG. 4, a method 400 of forming the fabric 100 is illustrated. In step 402, a foam core (e.g., foam core 102, 202, 302) is provided. The foam core may be one or more of the aerogels discussed in the Aerogels Handbook, which is referenced above. The foam core may be provided in a variety of different lengths, widths, thicknesses, and configurations.

In step 404, a yarn 104 is stitched through the foam core 102 as described herein. In an embodiment, the yarn 104 is stitched through the foam core 102 such that the majority of the surface area of the foam core 102 is covered. During the stitching process, the yarn 104 forms stitch holes 106 through the foam core 102 as shown in FIG. 1. In an embodiment, the foam core may be sufficiently flexible to contract around the yarn to effectively seal the stitch holes.

In an embodiment, it is desirable to seal off or plug the stitch holes (e.g., stitch holes 206) with a barrier layer (e.g., barrier layer 208). To do so, the barrier layer 208 may be disposed over at least one side of the foam core 202 as shown in the fabric 200 of FIG. 2. In an embodiment, the barrier layer is sufficiently heated (e.g., heated to a thermoplastic state) to flow and plug some or all of the stitch holes formed by the yarn. The stitch holes may be partially or fully filled when the barrier layer 208 is sufficiently heated.

In an embodiment, an additional or subsequent foam core is formed over the barrier layer on a side opposite that of the initial foam core. That is, the barrier layer is sandwiched between foam cores. The foam cores on either side of the barrier layer may be the same or substantially the same, or may be different. For example, one foam core on one side of the barrier layer may be formed from one type of aerogel, while the foam core on an opposite side of the barrier layer may be formed from another type of aerogel. Likewise, the foam core on either side of the barrier layer may have different properties such as, for example, a different thickness.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

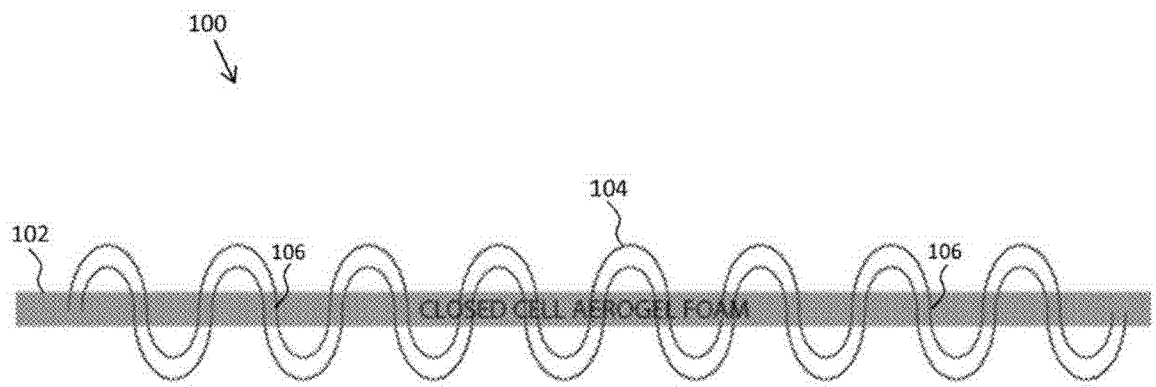

What is claimed is:

1. A stitched fabric, comprising:
   a foam core, wherein the foam core is a closed cell aerogel foam core; and a yarn stitched through and forming stitch holes in the foam core, wherein the yarn extends over at least a majority of a width and a length of the stitched fabric, wherein the stitched fabric is free from contact by another layer on either side of the stitched fabric.

2. The stitched fabric of claim 1, wherein a barrier layer is disposed over at least one side of the foam core, and wherein a melted portion of the barrier layer fills a portion of the stitch holes.

3. The stitched fabric of claim 2, wherein the barrier layer comprises a first material with a first melting point and a second material with a second melting point, the first melting point lower than the second melting point.

4. The stitched fabric of claim 3, wherein the first material is an adhesive and the second material is a porous membrane.

5. The stitched fabric of claim 3, wherein the first material is an adhesive and the second material is a non-porous film.

6. The stitched fabric of claim 1, wherein the yarn is a polyester yarn.

7. A stitched fabric, comprising:
a foam core, wherein the foam core is a closed cell aerogel foam core;
a yarn stitched through and forming stitch holes in the foam core, wherein the yarn extends over at least a majority of a width and a length of the stitched fabric;
a barrier layer formed over a first side of the foam core, wherein the stitched fabric is free from contact by another layer on either side of the stitched fabric.

8. The stitched fabric of claim 7, wherein the barrier layer is formed around the yarn.

9. The stitched fabric of claim 7, wherein a second barrier layer is formed on a second side of the foam core, the first side of the foam core opposite the second side.

10. The stitched fabric of claim 7, wherein a melted portion of the barrier layer fills a portion of the stitch holes.

11. The stitched fabric of claim 7, wherein the foam core comprises a silica or silica-based aerogel.

12. The stitched fabric of claim 7, wherein the foam core comprises two or more layers of foam.

13. The stitched fabric of claim 7, wherein the foam core comprises one or more non-foam layers sandwiched between layers of foam.

14. A method of forming a stitched fabric, comprising:
providing a foam core, wherein the foam core is a closed cell aerogel foam core; and
stitching a yarn through and forming stitch holes in the foam core, wherein the yarn extends over at least a majority of a width and a length of the stitched fabric, wherein the stitched fabric is free from contact by another layer on either side of the stitched fabric.

15. The method of claim 14, further comprising forming a barrier layer over a first side of the foam core.

16. The method of claim 15, further comprising forming a second barrier layer over a second side of the foam core, the first side of the foam core opposite the second side.

17. The method of claim 15, further comprising heating the barrier layer to a thermoplastic state to fill at least a portion of the stitch holes.

* * * * *

UNITED STATES PATENT AND TRADEMARK OFFICE
CERTIFICATE OF CORRECTION

PATENT NO. : 11,571,873 B2
APPLICATION NO. : 17/121402
DATED : February 7, 2023
INVENTOR(S) : Dustin English et al.

It is certified that error appears in the above-identified patent and that said Letters Patent is hereby corrected as shown below:

On the Title Page

Please replace the Title Page with the attached Title Page showing the corrected number of claims.

In the Claims

Column 6, Line 30 insert the following claim:
--18. The method of claim 14, wherein the foam core comprises a closed cell foam, an aerogel, or a silica or silica-based foam.--.

Signed and Sealed this
Twenty-sixth Day of March, 2024

Katherine Kelly Vidal
*Director of the United States Patent and Trademark Office*

CERTIFICATE OF CORRECTION (continued)

(12) United States Patent
English et al.

(10) Patent No.: US 11,571,873 B2
(45) Date of Patent: Feb. 7, 2023

(54) FABRIC WITH FOAM CORE

(71) Applicant: SWNR Development, LLC, Pagosa Springs, CO (US)

(72) Inventors: Dustin English, Pagosa Springs, CO (US); Timm Smith, Pagosa Springs, CO (US); Daniel L. English, Pagosa Springs, CO (US)

(73) Assignee: SWNR Development, LLC, Pagosa Springs, CO (US)

( * ) Notice: Subject to any disclaimer, the term of this patent is extended or adjusted under 35 U.S.C. 154(b) by 4 days.

(21) Appl. No.: 17/121,402

(22) Filed: Dec. 14, 2020

(65) Prior Publication Data
US 2021/0178724 A1 Jun. 17, 2021

Related U.S. Application Data

(60) Provisional application No. 62/947,882, filed on Dec. 13, 2019.

(51) Int. Cl.
*B32B 5/24* (2006.01)
*B32B 5/06* (2006.01)
*D06M 17/10* (2006.01)

(52) U.S. Cl.
CPC .......... *B32B 5/245* (2013.01); *B32B 5/06* (2013.01); *B32B 2266/057* (2016.11); *B32B 2266/126* (2016.11); *D06M 17/10* (2013.01)

(58) Field of Classification Search
CPC .......... B32B 2266/126; B32B 2266/08; B32B 27/065; A41D 31/065; A41D 31/06
See application file for complete search history.

(56) References Cited

U.S. PATENT DOCUMENTS

| | | | | |
|---|---|---|---|---|
| 2005/0281988 A1* | 12/2005 | McCormick | ....... | B32B 5/22 428/190 |
| 2010/0263154 A1* | 10/2010 | Wildeman | ....... | A47L 13/16 15/244.4 |
| 2012/0141719 A1* | 6/2012 | Payne | ....... | E04B 1/78 428/68 |
| 2014/0075646 A1* | 3/2014 | Henssen | ....... | D03D 1/0041 87/8 |
| 2014/0134391 A1* | 5/2014 | Lumb | ....... | B32B 5/06 428/102 |

OTHER PUBLICATIONS

Aegerter, Michel A., et al.; "Aerogels Handbook—Advances in Sol-Gel Derived Materials and Technologies" Springer; 2011; 972 pages.

* cited by examiner

*Primary Examiner* — Alicia J Sawdon
(74) *Attorney, Agent, or Firm* — Conley Rose, P.C.; William H. Dietrich

(57) ABSTRACT

A stitched fabric including a foam core and a yarn stitched through and forming stitch holes in the foam core, where the yarn extends over at least a majority of a width and a length of the stitched fabric. In some cases, the yarn and the foam core are free from contact by another layer on either side of the foam core. In some cases, a barrier layer is disposed over at least one side of the foam core and a melted portion of the barrier layer fills a portion of the stitch holes. In some cases, the foam core is a closed cell aerogel foam core.

18 Claims, 4 Drawing Sheets